July 12, 1960
C. L. STANCLIFF ET AL
2,944,336
METHOD OF REPAIRING AND PREVENTING THERMAL DAMAGE
IN COMBUSTION REGION WALL STRUCTURES OF LIQUID
COOLED INTERNAL COMBUSTION ENGINES
Original Filed July 7, 1955
9 Sheets-Sheet 1
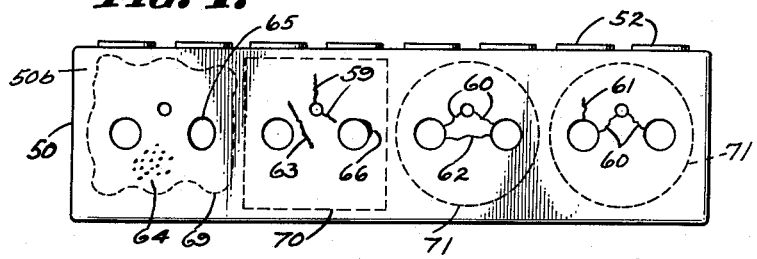
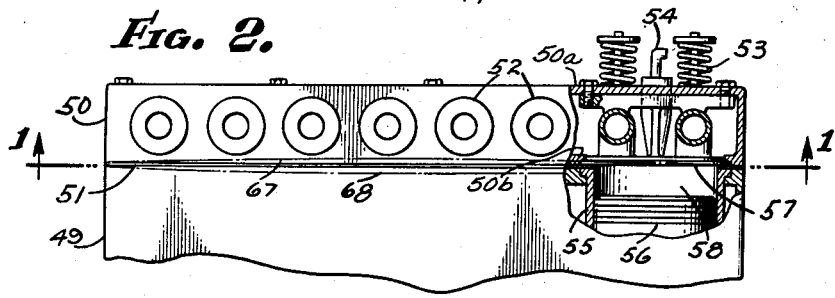
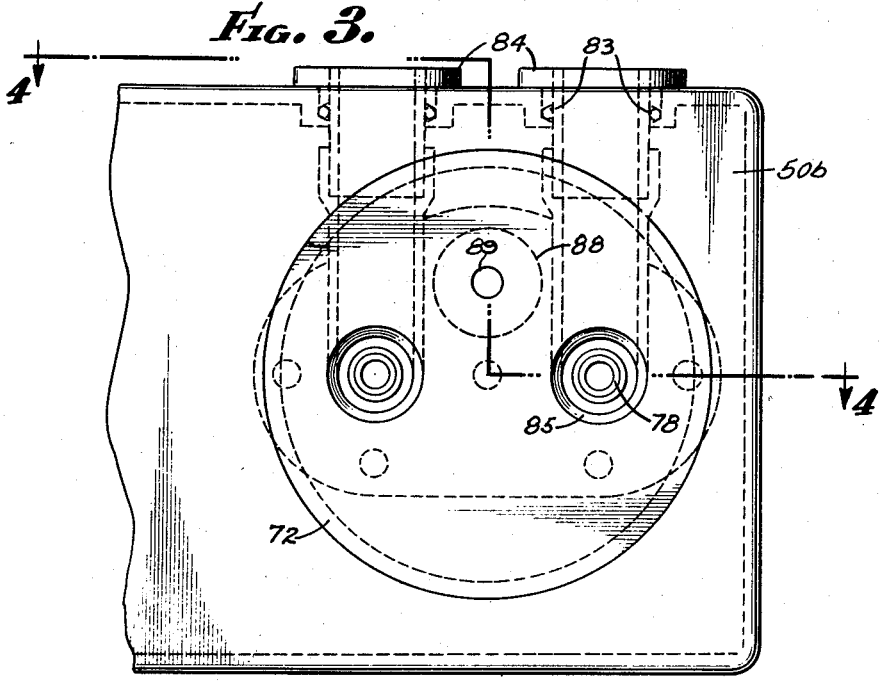
INVENTORS.
Clifton L. Stancliff
Gerald W. Stancliff

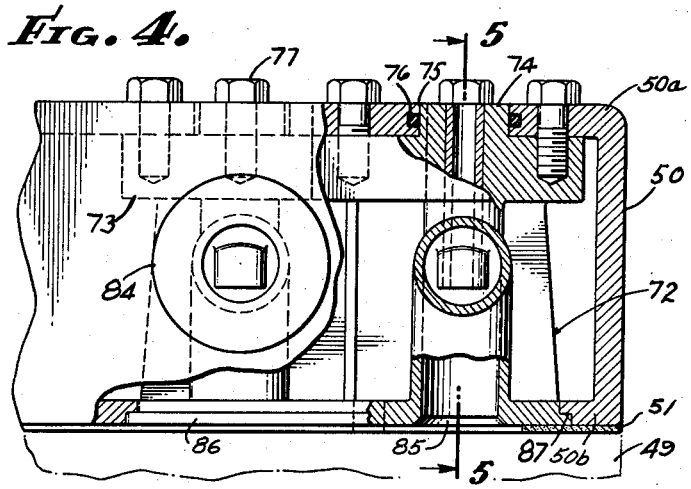
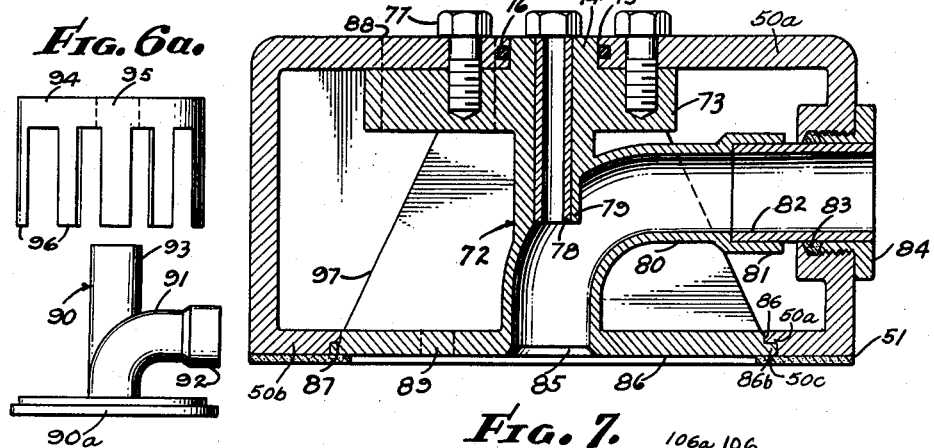

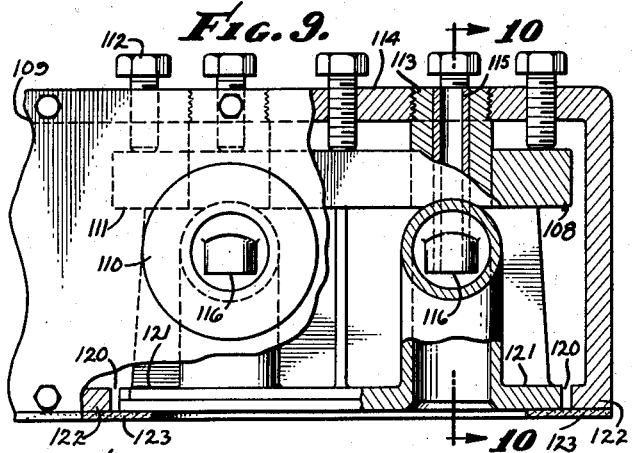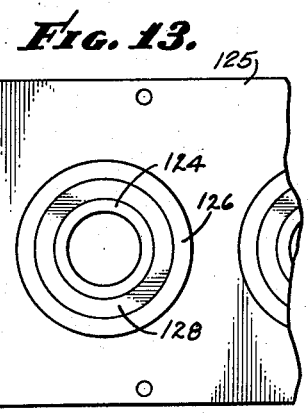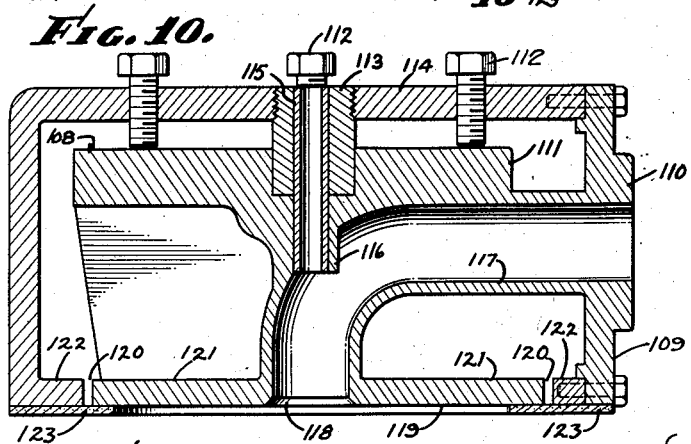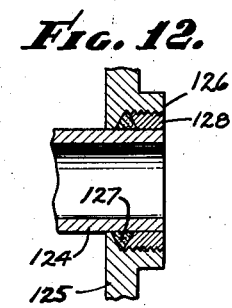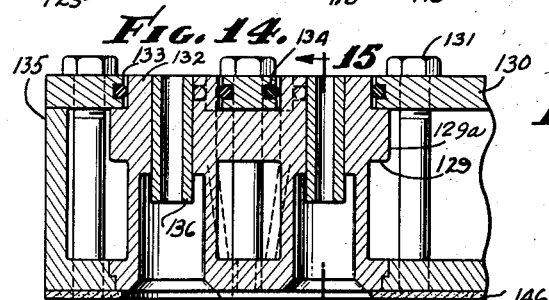

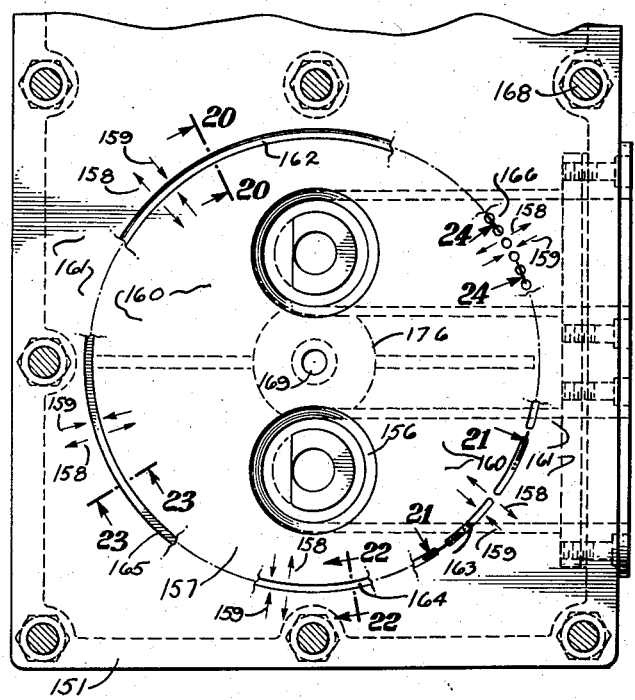
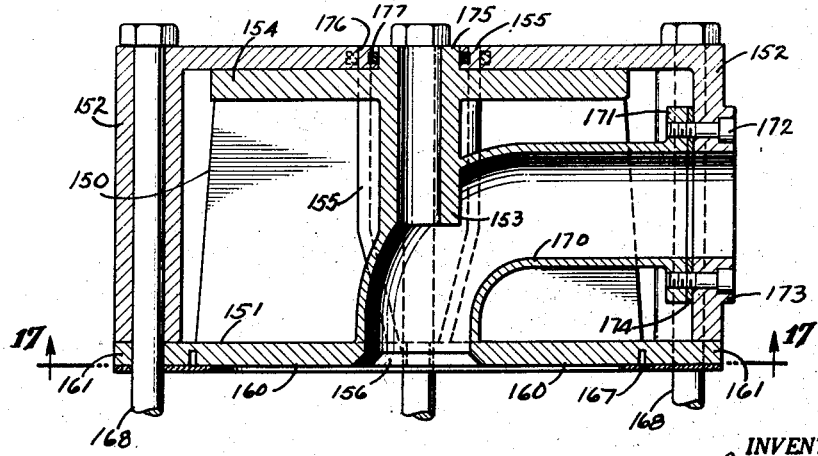

July 12, 1960
C. L. STANCLIFF ET AL
2,944,336
METHOD OF REPAIRING AND PREVENTING THERMAL DAMAGE
IN COMBUSTION REGION WALL STRUCTURES OF LIQUID
COOLED INTERNAL COMBUSTION ENGINES
Original Filed July 7, 1955
9 Sheets–Sheet 5
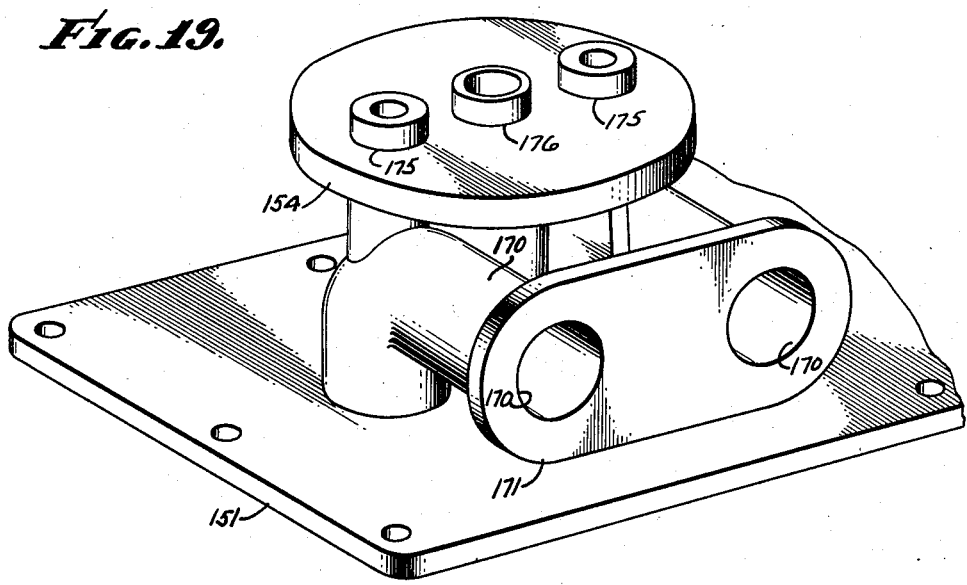
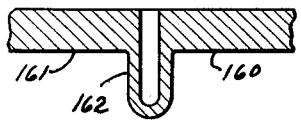
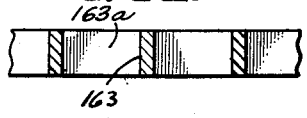
INVENTORS.
Clifton L. Stancliff
Gerald W. Stancliff

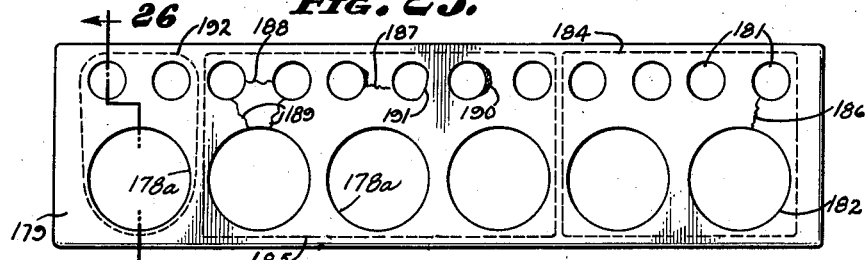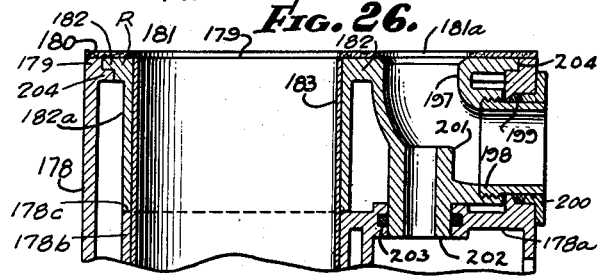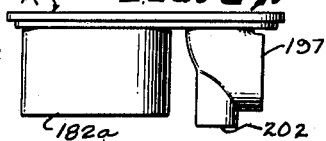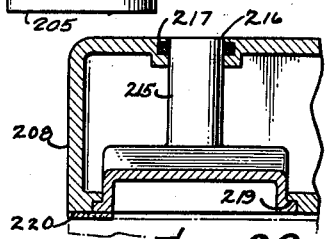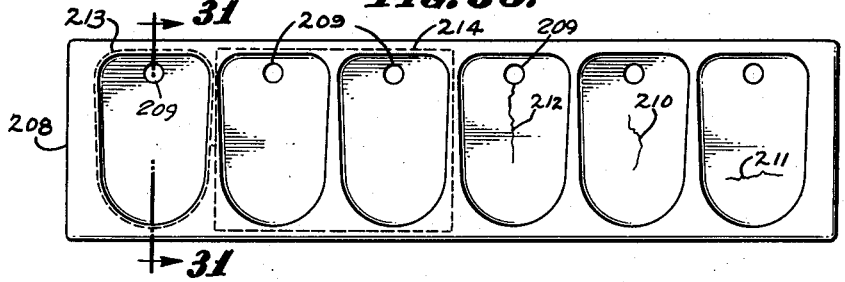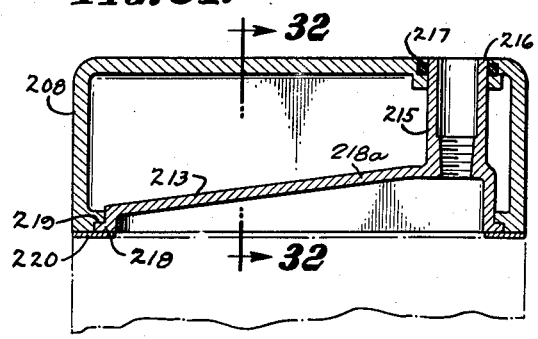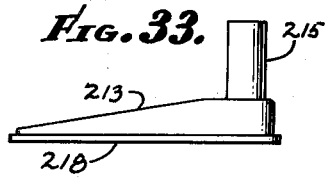

July 12, 1960 C. L. STANCLIFF ET AL 2,944,336
METHOD OF REPAIRING AND PREVENTING THERMAL DAMAGE
IN COMBUSTION REGION WALL STRUCTURES OF LIQUID
COOLED INTERNAL COMBUSTION ENGINES
Original Filed July 7, 1955 9 Sheets-Sheet 7
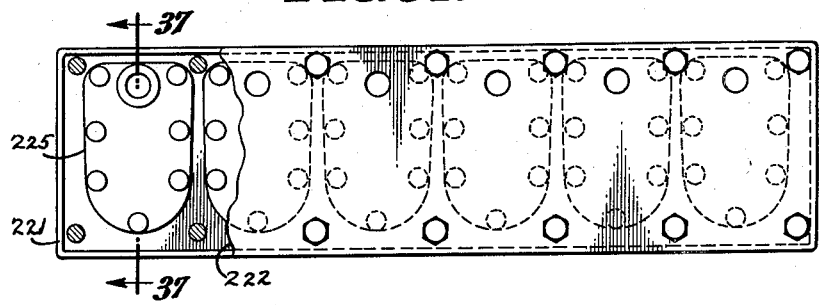
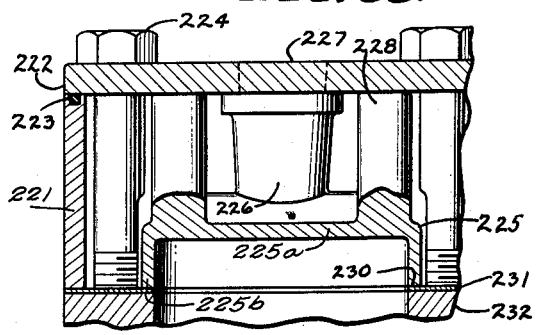
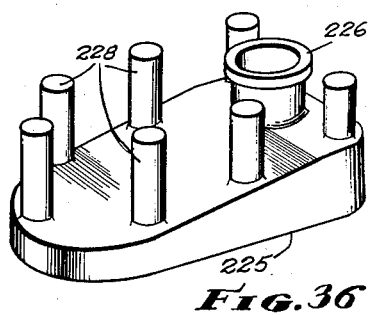
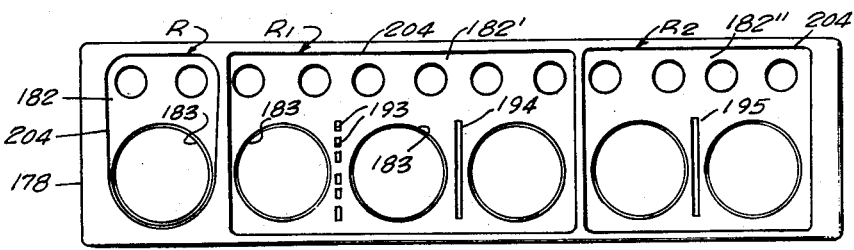
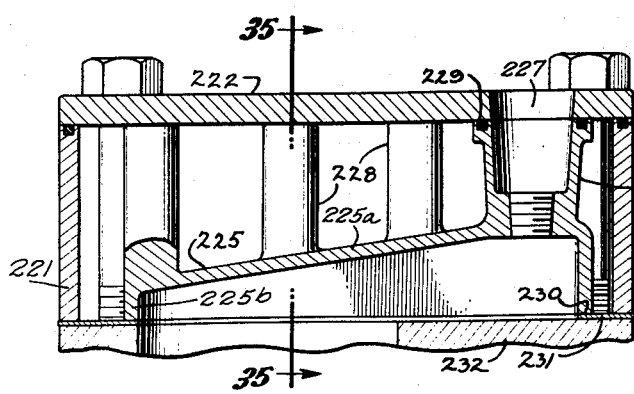
INVENTORS.

July 12, 1960  C. L. STANCLIFF ET AL  2,944,336
METHOD OF REPAIRING AND PREVENTING THERMAL DAMAGE
IN COMBUSTION REGION WALL STRUCTURES OF LIQUID
COOLED INTERNAL COMBUSTION ENGINES
Original Filed July 7, 1955  9 Sheets-Sheet 8
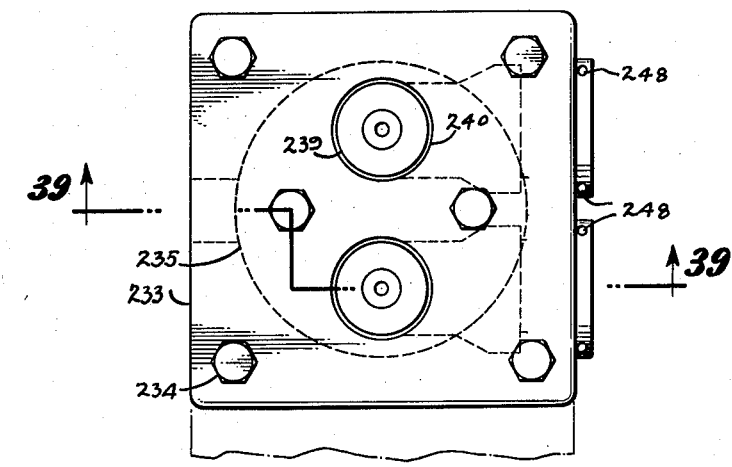
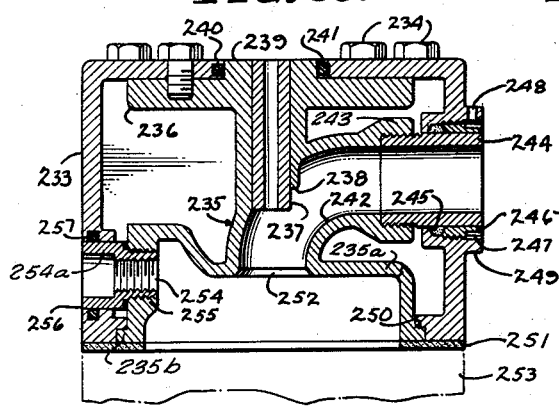
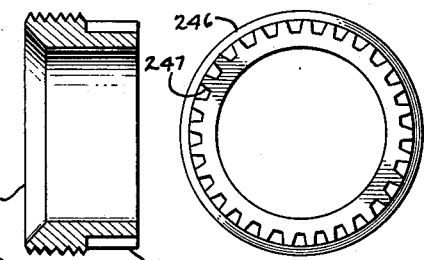
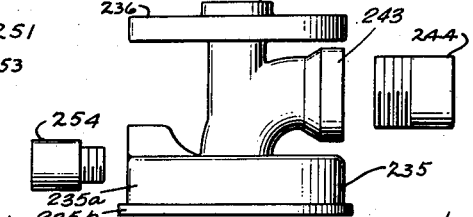
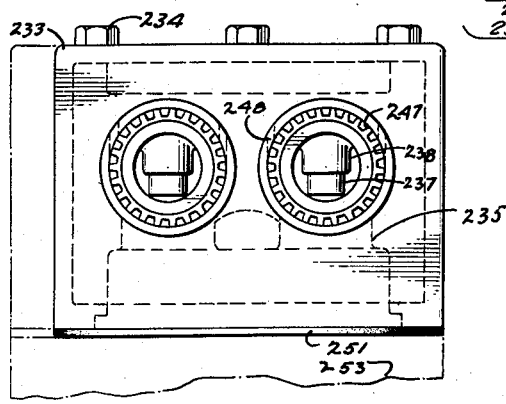
INVENTORS
Clifton L. Stancliff
Gerald W. Stancliff July 12, 1960
C. L. STANCLIFF ET AL
2,944,336
METHOD OF REPAIRING AND PREVENTING THERMAL DAMAGE
IN COMBUSTION REGION WALL STRUCTURES OF LIQUID
COOLED INTERNAL COMBUSTION ENGINES
Original Filed July 7, 1955
9 Sheets-Sheet 9
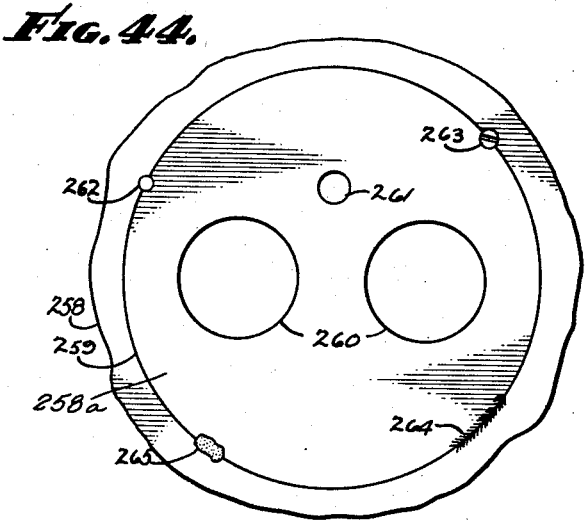
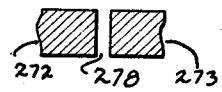
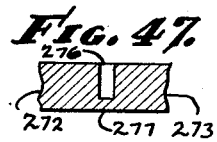
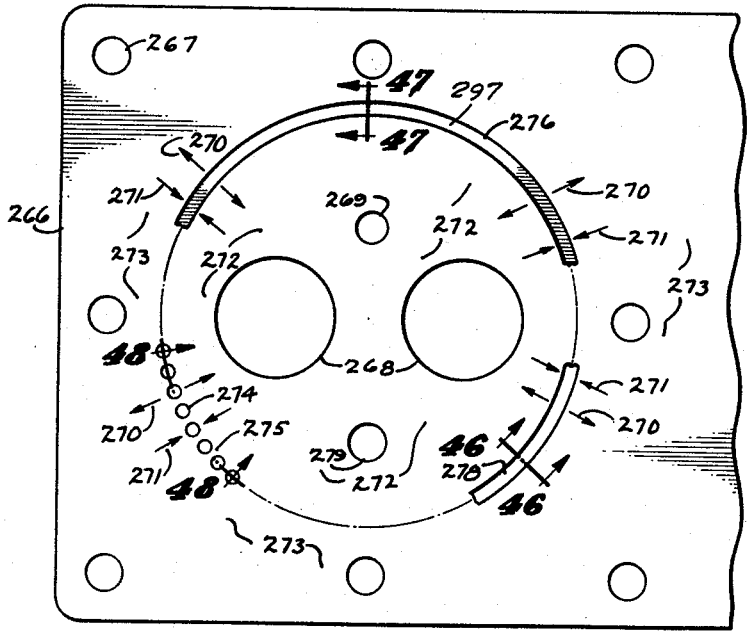
INVENTORS.
Clifton L. Stancliff
Gerald W. Stancliff

United States Patent Office 2,944,336
Patented July 12, 1960

2,944,336

METHOD OF REPAIRING AND PREVENTING THERMAL DAMAGE IN COMBUSTION REGION WALL STRUCTURES OF LIQUID COOLED INTERNAL COMBUSTION ENGINES

Clifton L. Stancliff and Gerald N. Stancliff, both of P.O. Box 1168, Bakersfield, Calif.

Continuation of abandoned application Ser. No. 520,550, July 7, 1955. This application Mar. 11, 1957, Ser. No. 645,096

8 Claims. (Cl. 29—402)

This invention relates generally to internal combustion engines, and more particularly to methods for repairing thermally damaged combustion chamber head portions and cylinder block portions, and which minimize or virtually eliminate future thermal damage. This application is a continuation of our pending application entitled Preventing and Rectifying Damage to Portions of Liquid Cooled Internal Combustion Engines Subject to Conflicting Thermal Stresses, filed July 7, 1955, Serial No. 520,550, now abandoned.

The cylinder heads and blocks of present day internal combustion engines are subject to severe damage as a consequence of their high operating temperatures. Temperature gradients cause compressive and tension stresses in the combustion chamber walls, and lead to cracking, buckling and warping, distortion of valve seats, and of the cylinder head and the cylinder block. The walls crack in the regions of the valve seats and injector ports. The combustion chamber head walls becomes pitted by combustion. The cylinder bore sleeves are also subject to warpage and pitting under the high heat of combustion. These conditions greatly reduce the useful life of an engine. Combustion originated engine damage also occurs from overheating owing to loss of coolant, as well as from refilling the overheated structure with coolant. Efforts have been made in the past to repair cracked engine blocks or cylinder heads by welding, or by removing a narrow portion of material along the crack, and installing a replacement insert. Such procedures as heretofore known, however, have not met with complete success, and a severely cracked head or block is generally deemed to require a total replacement.

It is a general object of the present invention to provide an improved method of repairing thermally damaged cylinder heads and cylinder blocks of internal combustion engines.

A more particular object is to provide a method of so repairing a thermally damaged engine cylinder head or block that the engine is not only restored to usefulness, but the cause of the damages is removed, and the repaired engine is virtually free from further damage of the same type.

A further object is to effect changes in an internal combustion engine according to which highly heated and stressed combustion chamber wall portions are completely separated and isolated from surrounding cooler running portions of the walls, thus eliminating the cause of the warping and cracking normally resulting from immobility or lack of freedom of adjacent portions of the casting to stretch, expand, contract and move free from binding and constriction during alternating and continuous periods of exposure to heat and cold.

A further object is to provide predetermined frangible connective joints between highly heated and cooler wall portions of the head and/or block, whereby fractures which may occur are pre-located in regions where harm to engine operation is not done.

Briefly introduced at this point, the present invention, in one illustrative form thereof, applied to the repair of a thermally damaged diesel engine cylinder head wall, with the damage, whatever its nature, being found in the combustion head wall area over the cylinder bore, contemplates the excising of a portion of the combustion head wall, throughout an area encompassing and overlapping somewhat, i.e., extending outside, the combustion chamber area. In a diesel engine, this combustion chamber area is approximately the area of the cylinder bore, and the excised area accordingly is somewhat larger than the cylinder bore area. A replacement unit is then fabricated, including a replacement head wall, which is shaped to fit into the aperture made in the original head wall. This replacement head wall is not, however, integrally joined to the remaining part of the original head wall, but merely mechanically fitted therein, and it is a preferred and important feature of the invention that this replacement head wall be so mechanically fitted as to afford a degree of sliding action in its installed situation to accommodate thermal expansion when the engine is heated. That is to say, there is provided, in effect, an expansion joint between the replacement head wall and the opposed edge of the remaining portion of the original head wall such as a gap, slidingly overlapped flanges, or a frangible region, such that, upon thermal expansion of the highly heated replacement head wall, it will not forceably engage the aperture defining edge of the cooler running outside or original head wall, which is more remote from the combustion flame. Thus, compressive strains ordinarily set up in the head wall under heated running conditions are relieved or prevented. The strains in an ordinary cylinder head wall actually occur in a complex pattern, owing to differential heating and temperature gradients extending in various directions. The described isolation of the replacement head wall from the remaining portion of the original or surrounding head wall prevents thermally induced strain transmission across the joint therebetween, and thereby relieves the strains in each. There is thus removed a primary cause of the fractures, warpage and buckling that necessitated the repair job, so that the engine is not subject to recurrence of the same type of damage. In this connection, in view of the damage prevention character of the replacement unit, such a unit may also be used in new engines, and thus becomes original construction rather than a replacement.

Between the replacement head wall and the top surface of the cylinder wall, around the cylinder wall, is placed a sealing gasket, which is effective to hold engine compression. This gasket may also extend under the joint or gap between the replacement head wall and the remainder of the original head wall.

The replacement unit is also equipped with means by which it is held down in position against explosion pressure, and may include also centering means cooperating with the cylinder head, new port tubes, which coact with the original cylinder head, and new valve seats and valve guide support structure, it being understood that the original valve seats and valve guide support structure, as well as port tubes, are cut away along with the removed portion of the cylinder head wall with which said parts were integral.

The invention contemplates a number of forms of thermal expansion joint between the replacement unit and the original head, a number of forms of replacement unit, and a number of ways in which the original cylinder head unit may be reconstructed to accommodate the replacement unit for any given job, all as will be described in the course of the ensuing detailed specification. The invention also contemplates repair, by similar procedures, of thermally damaged regions of the cylinder block.

Various additional objects and advantages, as well as the broad and specific nature of the invention itself, will appear and be described in the course of the following detailed description of a number of illustrative embodiments of the invention, reference for this purpose being had to the accompanying drawings, in which:

Figure 1 is a plan view of a high compression valve-in-head cylinder head taken on the line 1—1 of Figure 2, showing in dashed lines the areas of the cylinder head wall to be cut away in accordance with the invention;

Figure 2 is a side elevational view of the block and cylinder head of the engine of Figure 1, with parts being broken away to show underlying parts in section, and showing the original head after cutting away certain parts thereof, including an area of the combustion chamber head wall, valve seats and valve guide support structure, and port tubes, and installation of a replacement unit therein;

Figure 3 is an enlarged view of a portion of the cylinder head of Figures 1 and 2, shown after installation of the replacement unit;

Figure 4 is a section taken on broken line 4—4 of Figure 3;

Figure 5 is a transverse section taken on line 5—5 of Figure 4;

Figure 6 is an elevational view of the replacement unit of Figures 2-6;

Figure 6a shows a modified form of replacement unit;

Figure 7 is a transverse view through a cylinder head showing an alternative form of the invention;

Figure 8 is a perspective view showing a replacement head wall of Figure 7;

Figure 9 is a side elevational view, with parts broken away to show underlying parts in section, of another embodiment of the invention;

Figure 10 is a section on line 10—10 of Figure 9;

Figure 11 is a view showing the replacement unit of Figures 9 and 10;

Figure 12 is a sectional view of a modification of a portion of Figure 11;

Figure 13 is a side elevational view of the cylinder head side wall of Figure 12;

Figure 14 is a sectional view through the cylinder head of an engine showing another embodiment of our invention;

Figure 15 is a section on line 15—15 of Figure 14;

Figure 16 is a perspective view of a portion of the replacement top wall of the cylinder head of Figures 14 and 15;

Figure 17 is a bottom plan view of a replacement cylinder head wall of another embodiment of the invention, being taken on line 17—17 of Figure 18;

Figure 18 is a transverse sectional view through a cylinder head and replacement unit in accordance with the invention;

Figure 19 is a perspective view of the replacement unit of Figure 18;

Figure 20 is a detailed section taken on line 20—20 of Figure 17;

Figure 21 is a detailed section taken on line 21—21 of Figure 17;

Figure 22 is a detailed section taken on line 22—22 of Figure 17;

Figure 23 is a detailed section taken on line 23—23 of Figure 17;

Figure 24 is a detailed section taken on line 24—24 of Figure 17;

Figure 25 is a plan view of the cylinder block of an L-head engine showing various types of typical thermal damage, and showing in dotted lines the outlines of proposed excisions to take replacement units;

Figure 25a is a plan view of a cylinder block, similar to Figure 25, but showing replacement units installed;

Figure 26 is a section on broken line 26—26 of Figure 25 with a replacement R installed;

Figure 27 is an elevational view of the replacement unit of Figure 26;

Figure 28 shows a modified form of the subject matter of Figures 26 and 27;

Figure 29 is a fragmentary elevational view of the replacement unit of Figure 28;

Figure 30 is a bottom plan view of the cylinder head of an L-head engine, showing certain thermally damaged areas, and showing the outlines of proposed replacement units;

Figure 31 is a section on line 31—31 of Figure 30, showing a replacement unit installed in the cylinder head;

Figure 32 is a section taken on line 32—32 of Figure 31;

Figure 33 is an elevational view of the replacement unit of Figures 31 and 32;

Figure 34 is a bottom plan view of an L-head engine cylinder head, with replacement units installed;

Figure 35 is a section on line 35—35 of Figure 37;

Figure 36 is a perspective view of the replacement unit of Figures 34 and 35;

Figure 37 is a section on line 37—37 of Figure 34;

Figure 38 is a plan view of a portion of the cylinder head of an overhead valve internal combustion engine;

Figure 39 is a section taken on broken line 39—39 of Figure 38;

Figure 40 is a side elevational view of the cylinder head of Figure 38, viewed from the port side thereof;

Figure 41 is a detailed section taken from Figure 39;

Figure 42 is a front elevation of the subject matter of Figure 41;

Figure 43 is an exploded elevational view of the replacement unit of Figures 38 to 40;

Figure 44 is a plan view of a portion of a cylinder head wall and replacement insert showing various means of securing the latter within the former;

Figure 45 is a plan view of a cylinder head wall showing various forms of expansion joints between the heated and cooler areas of the wall;

Figure 46 is a detailed section on line 46—46 of Figure 45;

Figure 47 is a detailed section on line 47—47 of Figure 45; and

Figure 48 is a detailed section on line 48—48 of Figure 45.

In the utilization of our invention, there are several preliminary steps required to determine the particular type of modification of our device or the adaptation of the general principles in deciding on the steps to be taken.

In general, it is necessary to examine a thermally damaged internal combustion cylinder head and cylinder block to ascertain the type of damage and its severity such as expansion and contraction fractures, burned and/or distorted valve seats, severe pitting or general warpage of a complete cylinder head or cylinder block. In accomplishing this inspection, it is advisable to note whether the damaged area includes what would be the approximate size working surface required for a single cylinder or for two or more cylinders and the size and shape of the replacement or modification should be determined in conformity with this information. As a general rule, as indicated hereinabove, it will be advisable to cut through the working surface an area large enough to encompass the damaged parts of a single cylinder combustion chamber with a perimeter sufficient to exceed the inside perimeter of the cylinder combustion chamber and extend over the edge of the gasket between the head and cylinder block. When the discarded material is removed from the excised area of the cylinder head or block working surface with such other auxiliary parts as are necessary, a replacement is made which will contain all of the desired parts made and formed in such a manner as to slideably, movably, or tightly fit, as desired, the perimeter and limits of the removed portions. A number of modified methods of securing the replacement as a whole and also such other auxiliary parts as intake and exhaust ports and tubes, etc., have been disclosed and a corrective action should be selected which suitably corresponds to and fits the conditions and circumstances of the installation including a repair or modification job.

In addition to explaining our general purpose of separating or modifying the connection between the high thermally stressed areas and the low thermally stressed areas, it is desired to explain that though apparently the heat transferring, conducting, and dissipation factors might seem to be decreased by our method of separating and modifying the thermally stressed areas a counteracting advantage will be obtained from the reduction and/or elimination of deposits of scale and sand and poor heat conducting areas which will result from the use of thoroughly cleaned and conditioned replacement parts. In addition, presumably more efficient coolant circulation will be produced because the heat generated by the combustive process in the surface forming the cylinder combustion chamber will not be transferred to the surrounding metal of the cylinder head or block but will be transferred by direct contact to the coolant flowing to the hot areas from the cooler remaining portions of the cylinder head or block. The portions of the cylinder head or block which are separated and isolated from the extreme hot areas will be of reduced temperature and therefore the coolant flowing over them toward the combustion chamber will be cooler.

Our invention may be used as a complete new replacement for excised areas of the working surfaces of cylinder blocks or cylinder heads and, where it is not desired to effect a complete replacement, separation in part or in whole of the highly stressed areas from the lower stressed areas may be obtained by the use of expansion joints such as grooves, slits or cuts and various forms of structurally weakened and frangible connecting areas so that any undue thermal strains in areas not entirely separated and isolated, which tend to produce fracturing, will concentrate around and break at the predetermined frangible connecting locations.

Reference is first directed to that embodiment of our invention shown in Figures 1-6, inclusive. It will first be assumed that a repair job for a damaged engine is in contemplation, and it will later be pointed out that the structures described may also be incorporated in new engines.

The numeral 49 indicates a high compression diesel engine type valve-in-head cylinder block to which is secured cylinder head 50 with gasket 51 inserted between the block and head, both of which are provided with the usual valves, ports, fastenings and other necessary parts. Head 50 is a usual hollow casting having spaced upper and lower head walls 50a and 50b, and the space inside the head is supplied with coolant, in the usual manner.

The numeral 52 indicates the usual ports and 53 shows valve springs with an injector connection indicated by 54. In the block 49 and head 50, a cylinder barrel is shown at 55 with a piston 56 located therein adjacent to the cylinder head surface 57, all of which define the combustion chamber proper indicated at 58.

In the original head wall 50b of head 50 are shown various damaged areas such as injector inlet cracks 59, injector to valve seat cracks 60, valve seat cracks 61, valve seat to valve seat crack 62, and at 63 a crack occurring in the area between the valve seat and the injector inlet. At 64 are shown pits which result from the combination of combustion and water. The effects of distortion are indicated by an out-of-round valve seat at 65 and at 66 is shown a burned valve seat. Exaggerated illustrations of warpage are indicated at 67 for the head and at 68 for the block.

In repairing the damaged areas, portions of head wall 50b are excised along various shaped outlines, to be replaced by presently described replacement units, such as along the irregular outline shown by 69 or the square as at 70 and the circular at 71, all of which shapes may be used singly or in combination as required to produce the cut-out most suitable to the type of damage being repaired. It will be observed that the replacement outlines in each case encompass, with some overlap, the combustion chamber 58. Upper cylinder head wall 50a is also formed with a presently described opening to receive a presently described portion of the replacement unit. Figs. 2–5 also show the original valve guide support structure, as well as port tubes, to have been cut away along with the removed portion of the original head wall, so as to accommodate the replacement unit now to be described.

Numeral 72 indicates a replacement unit which is introduced through the opening made in the bottom wall 50b of the cylinder head. This replacement unit includes at the top, a mounting plate 73, formed with unthreaded centering bosses 74, snugly received and leak-proofed, as by sealing gasket 76, in aperture 75 cut through the top wall 50a of cylinder head 50. Mounting plate 73 engages and is held down by the underside of wall 50a, and machine bolts 77 secure it thereto. At the bottom, replacement unit 72 is provided with head wall 86, fitted, as presently described, into the opening made in head wall 50b, wall 86 being structurally connected to mounting plate 73, as shown.

The valve guide 78 is surrounded by casting portion 79 forming a part of the replacement unit, which unit also includes valve port tube 80 having connector bell 81 within which is tightly secured sleeve 82 extending through the original side wall of cylinder head 50 where it is secured with sealing gasket or O-ring 83 under sufficient pressure to prevent leakage, by adjustable gland nut 84. This gland structure affords a sliding joint for the sleeve 82, to accommodate thermal expansion of the port tube, and thus relieve stresses otherwise set up.

Valve seats 85 are provided in replacement unit head wall 86, as required.

The periphery of replacement unit head wall 86 is provided with what may broadly be termed an expansion joint or jointure 87 at its juncture with the edge of original head wall 50b that defines the opening cut therethrough, as heretofore described. This joint 87, in the embodiment of Figures 1–5, is so designed as to accommodate relative sliding movement of wall 86, relative to wall 50b, as the former expands to a greater degree than the latter as the engine heats up. In the present illustrative embodiment, the opposed peripheral edges of wall 86 and wall 50b are formed with complementary rabbet or step grooves 86a and 50c, respectively, thereby forming projecting and overlapping ledges or flanges 86b and 50d, respectively, of which the flange 50d overlies and slideably engages the flange 86b. This arrangement causes the replacement unit head wall 86 to be held down, in part, by the wall 50b against the force of explosions occurring in the combustion chamber. The replacement unit is also held down by the upper wall of the cylinder head in engagement with replacement unit mounting plate 73. To permit the described sliding action, small clearance spaces will be understood to exist between the forward edge of each of said flanges and the bottom of the groove into which it is received when the engine is cold. In the drawings, the parts are illustrated in the heated or running condition of the engine, with the wall 86 thermally expanded, and the clearance spaces referred to will be understood to have become substantially closed, owing to the higher running temperature of wall 86 relative to wall 50b.

Under and inside of the described sliding jointure and extending entirely therearound, i.e., disposed on at least the inner side of the expansion joint between walls 50b and 86, and located between walls 50b and 86 above and the top of the engine block below, is compression sealing gasket 51 which serves to seal against leak of engine compression.

The injector tube is mounted in apertures 88 and 89 and at 97 are shown reinforcing ribs extending between mounting plate 73 and replacement head wall 86.

The method of engine repair represented by Figures 1–6 should now be clear. First, the thermally damaged area of the original cylinder head wall 50b is cut away or excised, along a line encompassing, and spaced somewhat outside, the area of the combustion chamber. Other portions of the original structure integral with the removed portion of the head wall are removed, so that the head then appears as in Figs. 4 and 5. An aperture 75 is cut through the top wall of the cylinder head for the boss 74 of the replacement unit. At the time the cylinder head is thus "opened up," it may be desirably cleaned out, sand blasted, and treated with rust inhibitor. A replacement unit is then fabricated, having replacement head wall 86 for the cut-away portion of the original head wall, and this replacement head wall is so designed as to have a sliding, expansion joint type of fit with the opening left in the original head wall. The replacement unit as described above is then installed with the sealing gasket 51 in place, and secured, as by screws 77. As described above, this replacement unit also includes new valve seats, valve guide support structure, and port tubes, the latter being fitted into the original side wall of the head. The repaired construction is strong and leak-proof against engine compression. The unit is held down by the overlapped flange construction at the jointure 87 and by the top cylinder head wall in engagement with mounting plate 73. Moreover, the replacement organization is designed to withstand warping and distortion of the very kind that is responsible for most repair jobs of the kind here in question, for the reason that the replacement head wall 86 has been furnished with a capability for limited expansion relative to the remaining portion of the original head wall 50b. In this connection, it is clear that the replacement head wall 86, directly covering the combustion chamber, is subject to far greater heating than is the wall 50b outside the direct limits of the combustion chamber. By the sliding jointure provided, the higher temperature wall 86 is permitted free thermal expansion, without forceably abutting directly against the opposed edges of wall 50b, and hence without setting up compressive stresses in either or both of walls 86 and 50b, with consequent inevitable warping, buckling, and ensuing distortions, as well as actual fractures. Troubles of the kind causing the necessity of the repair job are thus removed. Further, and from this standpoint, the structure described is desirable and intended for new engine constructions, as well as repair jobs. When used in new engines, the thermal stresses described as responsible for warping and fracturing are prevented at the outset, and the necessity for repair jobs, owing to the results of unrelieved stresses is therefore avoided.

As an alternate construction to the one-piece replacement with attached reinforcing ribs, the numeral 90 (Figure 6a) indicates a modified form of replacement less the reinforcing ribs, but which, however, includes the port tube 91, connecting bell 92 and centering boss and valve guide housing 93. The replacement unit includes an auxiliary mounting plate 94 having aperture 95 for the centering boss 93, and provided with a plurality of reinforcing legs, rods or studs 96 which bear upon the top of replacement head wall 90a to support and transfer the explosion stresses to the top wall or other suitable portions of the cylinder head.

In Figures 7 and 8 is shown a modified embodiment of the invention. Here, the entirety of the bottom wall of the cylinder head 97 has been removed as a first step of the repair procedure. The cylinder head is thus better opened up to facilitate cleaning. In its place is installed a new bottom head wall 102, furnished with holes 102a to receive the usual cylinder head studs, not shown.

The new bottom head wall 102 has apertures 103 over the several cylinder barrels of the engine, and understood, as in Figures 1–6, to encompass and be somewhat larger than the cylinder bore (or combustion space thereover). The replacement unit, generally designated by numeral 98, includes mounting plate 98a, similar to that used in Figures 1–6, port tube 99 provided with sealing gasket or O-ring 100 tightly secured by adjustable gland nut 101, in which the tube 99 may slide to accommodate thermal expansion, replacement head wall 104, received in aperture 103, and bracing ribs 98b. A removable centering boss 106 is received into aperture 106a, cut through the top wall of the cylinder head. A slit, cut or narrow gap 105 entirely separates and isolates the replacement head wall 104 from the defining edge of the aperture 103 in the removable or replacement bottom head wall 102, thus providing for thermal expansion of wall within aperture 103. As before, the drawings show the engine in its heated or running condition, with the said cut or gap 105 substantially closed. It will be understood, however, that in accordance with the teachings of the invention, the relationships are made such that, with the engine heated, and replacement head wall 104 at higher temperature than cylinder head bottom wall 102, substantial compressive stresses, owing to differential expansion, are not transferred from wall 104 to wall 102. As in the embodiment of Figures 1–6, a compression sealing gasket 107 is installed underneath and inside the expansion joint formed between the walls 104 and 102, effecting a compression seal to the top surface of the cylinder block.

Figures 9–13 show an embodiment of the invention in which, in addition to excising a damaged portion of the original head wall of the cylinder head, the side wall of the original head, through which the engine ports extend, is also removed, and in which the replacement unit includes a replacement side wall, as well as a replacement head wall.

Referring to Figure 10, it will be seen that the cylinder head 114 has a head wall 122, from which a damaged area has been excised, and it will be understood that the aperture so formed is again of a size to encompass the cylinder bore below, with some overlap, as in Figures 1–6. As also shown in Figure 10, the original side wall of the cylinder head has been removed on the ported side. The replacement unit 108 includes a new side wall portion 109 formed with port boss 110, and secured in place by machine screws, as shown. It also includes mounting plate 111, engaged and buttressed by machine screws 112, threaded through the upper head wall, and replacement head wall 119 fits within the aperture formed in the original head wall with a clearance space all around, as indicated at 120. Below and inside the thermal expansion joint so formed is placed compression sealing gasket 123. A port tube 117 joins wall 119, mounting plate 111 and side plate 109, and suitable bracing ribs may be used, as shown. A valve seat 113 is formed in the bottom of wall 119, in communication with a bore leading to port tube 117. As shown in Figure 10, a centering plug 113 is seated in a socket in the top of mounting plate 111, being threaded in a bore formed in the top wall of cylinder head 114, and valve guide 115 extends through this centering plug and through plate 111 to protrude into the passage above valve seat 118.

Figures 12 and 13 show a modification of Figure 10, wherein the port tube 124 is fitted into and slidingly extends through a port boss 126 on a separate removable side plate 125, a gasket or seal ring 127 and gland sleeve 128, sealing the port tube against leakage.

The procedure involved in making a repair according to Figures 9–12 will be evident from the foregoing. The expansion joint, in this instance an open gap 120, isolates the hot region 121 from the lower temperature area 122, as before, permitting unrestricted thermal expansion of the replacement head wall 119 without transferring stress to the wall 122, and so avoiding warping and buckling strains in both members. An effective compression seal is again afforded by the gasket 123. As in the cases instanced hereinabove, the construction of Figures 9–13 lends itself to new engine structures, as well as to the repair of damaged engines. In either case, damage to the engine by reason of thermally induced stress differentials between the highly heated region 121 and the less highly heated region 122 are prevented.

Figures 14–16 show an alternative embodiment, wherein in addition to excising a damaged area of the lower head wall of the cylinder head, to be replaced by an isolated but compression sealed replacement head wall, the entire top wall of the cylinder head is removed, and a replacement top wall installed in its place. The replacement unit is designated generally by numeral 129, and the cylinder head, with top wall removed, and a damaged area of its lower wall removed, by numeral 135. A new, removable top wall 130 is fitted to cylinder head 135 by screws 131 reaching down and threaded into the cylinder block. Top wall 130 is provided with apertures 133 for positioning bosses 132 on the replacement unit, O-ring seals 133 being shown for sealing purposes, and the replacement unit has an upper plate portion 129a which is engaged by the removable wall 130. The replacement unit has lower head wall 147, provided with a sliding, overlapped type of thermal expansion jointure 145 with the lower wall of the cylinder head, as described in connection with Figures 1–6, a compression sealing gasket 146 being used, as in earlier embodiments.

Valve guide 136 is surrounded by casting portion 137 forming a part of replacement 129. Port tube 138, also a part of replacement 129, is provided with a threaded connector bell 139 for threadable insertion of connector sleeve 140 which is provided with a sliding fit through sealing gasket or O-ring 141 under pressure from adjustable gland sleeve 142 in port boss 143. Valve seat 144 is provided in replacement head wall 147. An injector 149a is inserted through aperture 149 in removable top plate 130 and through aperture 148 in replacement wall 147.

As with the embodiments heretofore described, the construction of Figures 14–16 is suited as a replacement for damaged engines, or as original construction in new engines.

Figures 17–24 show further modifications of the invention, illustratively of the type wherein the original bottom wall of the cylinder head is removed. In this case, the replacement unit or assembly 150 includes a plate or wall 151 which replaces the entire original bottom wall of the cylinder head. This replacement unit includes mounting plate 154 underlying and engaged by the top wall of the cylinder head, a valve seat 156 in wall 154, a centering boss 175 fitted, and sealed at 177, in an aperture cut through the top wall of the cylinder head, an injector aperture 176 in which the injector 176a is received and sealed, a valve guide portion 153, and port tube 170. The port tube 170 is provided with a flange 171 for fastening to port boss 173 by means of screws 172, a sealing gasket being used at 174.

The plate or wall 151 is divided into two parts 160 and 161 by a thermal stress relieving jointure, several illustrative forms of which are shown in Figure 17 and Figures 20–24, inclusive. This jointure will be understood to again encompass and extend somewhat outside the combustion chamber area over the cylinder bore (not shown), and has under and extending inside it, a compression sealing gasket 167. The two parts 160 and 161 of wall 151 may be integrally connected across the jointure, or separated therefrom, according to the specific joint design.

At 162 in Figure 20, the jointure comprises a flexible, imperforate fold or loop 162, permitting radial expansion and contraction of highly heated inner part 160 relative to the cooler outer part 161.

In Figure 21 is shown a jointure comprising frangible webs 163 across a circumferential slot 163a. This structure permits a degree of expansion and contraction of inner part 160 relative to outer part 161; but if deformation is excessive, the frangible webs 163 may fracture, with no harm to the engine, the fracture being confined to a predetermined location at which no engine damage requiring repair has been done.

In Figure 22, the parts 160 and 161 are separated by a circumferential clearance space or gap 164 accommodating expansion and contraction of inner part 160.

In Figure 23, the jointure comprises a deep circumferential groove 165, leaving a thin, frangible connecting portion which may fracture upon becoming highly stressed. As in Figure 21, such fracture occurs along a predetermined line where no harm to the engine is done.

Finally, Figure 24 shows a frangible jointure comprising a plurality of close spaced drill holes 166.

By way of further illustration of stresses set up in the head wall or plate 151 during heating and cooling of the engine, we have, in Figure 17, represented at 158 thermal tension stresses acting across the jointure, and at 159 thermal compressive stresses, these developing owing to the fact that the inside part 160, directly exposed to the flame, is heated to much higher temperatures than the outside part 161, which is heated only by conduction, and in addition is liquid cool, causing greater alternate and continuous expansion and contraction of part 160 as compared with part 161. The heated part 160 opposes the cooler part 161. The jointures shown are capable of accommodating the expansions and contractions of part 160, and relieve the stresses represented at 158 and 159.

In Figures 25–27, inclusive, we have shown an application of the invention to the cylinder block 178, where upper head wall 179 has suffered thermal damage. In Figure 25, cylinder bores are indicated at 178a, and valve seats at 181. A single crack to the cylinder from a valve seat is shown at 186, a crack leading out from a valve seat is shown at 187, a crack from valve seat to valve seat at 188, and double cracks from valve seat to cylinder at 189. At 190 is shown a burned valve seat and at 191 a warped valve seat, resulting from thermal stresses.

The method of the invention involves excising portions of the block head wall 179, to accommodate replacement units, for example, a two cylinder replacement along outline 184, a three cylinder replacement along outline 185, and a single cylinder replacement along outline 192. It will be observed that each replacement outline encompasses the cylinder barrel or barrels, with the inclusion of some overlap area all around, and that in the case illustrated, the outline also surrounds the valve seat areas.

With reference now also to Figure 26, the original barrel 178b is in this case cut off at a suitable distance below head wall 179.

An illustrative single cylinder replacement unit is designated at R in Figures 26 and 27. This replacement unit includes a new head wall 182, shaped to conform to the cut-away outline 192, and provided with an integral cylinder member 182a which abuts the upper end of the remainder of the original cylinder 178b, a cylinder liner sleeve 183 being inserted, as shown. The periphery of the replacement head wall 182 is provided with a sliding, expansion jointure 204 with the opening cut in the original head wall; and in the present instance, this jointure is of the overlapped flange type particularly described heretofore in connection with Figures 1–6. As there described, a small clearance is provided in this joint, permitting a sliding action as the highly heated replacement head wall 182 expands to a greater extent than the remaining portion of the block head wall. The engine is to be regarded as shown in its heated, running condition, as shown in Figure 26, with this clearance space substantially taken up. The replacement unit also includes new valve seats 181a, valve port tube 197 provided with threaded sleeve 198 slidingly fitted in sealing gasket or O-ring 199 and gland nut 200 installed in the side of the block, and valve guide 201. This valve guide 201 is provided with a centering boss 202 adapted to be received and sealed within an opening formed in block wall 178d.

A compression sealing gasket 180 is placed on top of replacement head wall 182, in position to seal between said wall and the opposed face of the cylinder head; and as here shown, this gasket also extends across the expansion joint and over the remaining portion of head wall 179.

In Figures 28 and 29, we have shown a modification of Figure 26, wherein the entire original cylinder barrel is removed, and the replacement cylinder barrel, here indicated at 205, is full length to accommodate the piston stroke, and is sealed in crank case wall 207 by a gasket 206.

In Figure 25a, we have shown a plan view, similar to Figure 25, but subsequent to installation of replacement units R, R₁ and R₂, of which replacement unit R is as above described in connnection with Figures 25–27, and the replacement units R₁ and R₂ encompass three and two cylinders, respectively, the former being shown with new head wall 182' and the second with new head wall 182". These head walls are provided, between the cylinder bores, with expansion joints, of which several representative forms are shown, including a row of spaced perforations 193, with frangible webs therebetween, a slot 194, and a deep groove 195. These relieve compressive strains in the head wall areas immediately around the cylinder barrels, and serve to reduce or eliminate warpage.

The structures of Figures 25–29 will be understood to be applicable either to replacements in damaged engines, or to new engine structure.

In Figures 30–33 are shown a replacement for the cylinder head 208 of an L-head internal combustion engine. Referring to Figure 30, spark plug apertures are indicated at 209. At 210 is represented a transverse crack due to a longitudinal strain, at 211 a longitudinal crack owing to a transverse strain, and at 212 a transverse crack extending inwardly from spark plug aperture 209. At 213 and 214 are shown, respectively, single and two cylinder replacement units. Referring now to Figures 31 and 33, the replacement unit 213 is provided with peripheral head wall flange 218, with which is integrally formed combustion chamber head wall 218a. Joined with the upper portion of combustion chamber head wall 218a is spark plug housing 215, which protrudes through and is sealed, as at 217, within an aperture formed in the top wall of head 208, thus functioning as a positioning means. The flange portion 218 of the replacement unit is provided with a sliding, expansion jointure 219 with the opposed wall edge left when the damaged area of original head wall was excised. It will be understood, in line with discussions of earlier embodiments, that the first step in the procedure is to excise the original, damaged head wall along such an outline as 213. The sliding jointure is here shown as of the above described overlapped flange type, with freedom for thermal expansion of the replacement by sliding action of the jointure flanges on one another to take up originally provided clearance space. An underlying compression sealing gasket is used, as at 220.

Figures 34–37 show a modification of the L-head engine cylinder head replacement of Figures 30–33. Here it may be assumed that an entirely new cylinder head is provided, assembled from separate side and top wall components. Alternatively, the damaged lower head wall of the original cylinder head is also completely removed, leaving only the side wall 221 of the original cylinder head. An insert unit 225 is provided, and includes a combustion chamber defining wall 225a, with a marginal flange 225b having its lower edge 230 in engagement with cylinder block 232. As indicated, this edge encompasses the cylinder bore below, and the entire length of the combustion chamber (Figure 37). Head plate 222 is provided, resting down on the upper edge of the side wall 221, and a sealing gasket or O-ring 223 seals the juncture therebetween. Head plate 222 is held down to block 232 by means of studs 224. The insert unit is provided with posts 228 which are engaged by plate 222 for purpose of adequate support of the replacement unit against explosion pressure. The insert unit is further provided with spark plug housing 226, which is peripherally engaged by plate 222, and sealed at 229, an access hole 227 for the plug being formed in plate 222. A compression sealing gasket 231 underlies the lower insert edge 230. It will be seen that the marginal wall portion or flange 225b is spaced by an expansion gap from the cylinder head side wall 221, and therefore is unconfined by and isolated from the latter, so that it is free for expansion and contraction movements.

Figures 38–40 show a replacement for a damaged head wall of an overhead valve internal combustion, spark plug engine. The damaged lower wall of the original cylinder head 233 is cut away on an outline encompassing the cylinder bore in the block 253. The replacement unit 235 has at the top a mounting plate 236 adapted to be engaged by the underside of the top wall of head 233, and formed with centering boss 239 received and sealed, as at 241, in aperture 240 formed in the top wall of the head. Extending downwardly through this centering boss 239, and opening into port tube 242 in a position over valve seat 252, is a valve guide tube 237. The port tube 242 joins the replacement wall 235a that defines the new combustion chamber, and this wall 235a is formed with a peripheral flange 235b that is fitted in the aperture in the remaining portion of the original head wall, using, in this instance, a sliding expansion joint at 250 of the type described in connection with Figures 1–6, a compression sealing gasket 251 being used, as shown. Port tube 242 is formed with an internally threaded connector bell 243, into which is threaded connector sleeve 244 held in sliding but leakproof condition by sealing gasket or O-ring 245 and adjustable threaded gland sleeve 246 threaded into port boss 249. Sleeve 246 is preferably formed with cogs 247 for tightening by means of an adjusting tool or pin through holes 248 in port tube boss 249. A spark plug housing 254 is threaded through the side wall 235a of the replacement unit, and has a tubular external portion 254a which protrudes through an aperture 256 formed in the side wall of cylinder head 233, being sealed therein by O-ring seal 257.

In Figure 44 are shown various means of aligning a replacement or reconditioned head wall 258a in a cylinder head wall 258. The wall 258a may be of any shape, though here shown as circular, being fitted into the circular aperture 259 which has been formed in original head wall 258. Valve apertures are shown in wall 259a at 260, and an injector port at 261. An aligning and securing pin is illustrated at 262, inserted in an aperture half formed in wall 258 and half formed in wall 258a. At 263 is indicated a screw, threaded half into wall 258 and half into wall 258a. A spot welded juncture is indicated at 265, and a brazed joint at 264. Between the fastenings, the walls 258 and 258a may be unconnected. These spaced fastenings permit limited "working" of the wall 258a within the wall 258, thus affording some flexibility and accommodation for thermal expansion of the member 258a relative to member 258.

Figures 45–48 show various expansion joints formed in the lower head wall 266 of a cylinder head, between the highly heated regions directly over the cylinder, and the cooler regions outside thereof. The original head wall is formed with bores 267 for holding the unillustrated head casting above the wall 266, and the wall 266, tightly down to the block, also not shown. Wall 266 is shown furnished with valve apertures 268, injector aperture 269, and air inlet aperture 279. The arrows 270 and 271 diagrammatically represent thermal tension and compressive stresses, respectively, occurring across the regions between the highly heated and highly stressed central area 272, over the cylinder bore, and the cooler and less stressed outer areas 273. The expansion joints illustrated relieve these stresses, which are developed as the engine heats and cools. The joint at 274, consisting of a line of perforations, connected by web portions capable of easy fracture, forms a frangible type of joint, which has certain inherent flexibility to accommodate expansion and contraction, but which will fracture upon occurrence of substantial stresses. The fracture that may occur is along a predetermined line in a preferred location, such as will not put the engine out of running commission. An alternative groove type joint is indicated at 276, the bottom of which comprises a frangible web 277, and has properties similar to the joint discussed immediately above. At 278 is shown a through-slot, which may extend entirely around the inner wall region 272, isolating it completely from the outer wall region 273. In other words, by this construction, the wall is separated into inner and outer wall portions, separated by a clearance or gap, and permitting substantial thermal expansion of the inner wall portion relative to the outer wall portion without abutment taking place, with resulting compressive stresses in the members. These joints will be understood to be equipped with sealing gaskets such as disclosed in earlier embodiments; and the inner wall member 272 will further be understood, in practice, to be furnished with any suitable hold-down means, such as disclosed in connection with earlier embodiments, and such as will maintain it in position notwithstanding complete severance from the outer wall member 273.

An important procedure in all forms of the invention comprises the cleaning, as by sand blasting, etc., and rust proofing, of all replacement inserts, for the purpose of improving their heat transfer characteristics, to the end that conduction of heat from said parts to the liquid coolant is materially enhanced.

As mentioned in the foregoing, the "replacement units" of the invention, while described primarily as replacements for damaged parts of an old engine, contribute a benefit not possessed by conventional engines, i.e., prevention of damage caused by compressive and tension strains by the relief or elimination of those strains. Accordingly, the invention is applicable not only to the repair of old and damaged engines, but new engines may incorporate the novel structures disclosed, with the advantage that they will not be subject to damage of the kinds described in the foregoing.

It will be understood that while the forms of our thermal damage replacements and structural modifications herein illustrated and described are to be considered as preferred embodiments of our invention, we do not limit ourselves to the precise constructions as disclosed, but reserve the right to resort to and substitute various modifications and changes in shape, size, and arrangement of parts and substances without departing from the spirit of our invention or the scope of our claims as described and indicated above and in the drawings and the following claims.

We claim:

1. The method of altering an original wall of an internal combustion engine comprised of cylinder head and cylinder block, said wall having an inner flame-contacted area defining a combustion chamber and an outer cooler-running area therearound, that includes: making an opening in said wall by excising the entirety of said wall throughout the inner, flame-contacted combustion chamber area thereof and including a marginal portion of said wall outside said flame-contacted area along an outline encompassing and marginally spaced at all points outside the perimeter of said combustion chamber defining area of said wall, fabricating a replacement insert wall of outline substantially complementary to the opening so made in the original wall, mechanically installing said insert wall in said opening, preserving said insert wall essentially physically separate of the remaining portion of said original wall, in such manner as to accommodate thermal expansion and contraction movements thereof relative to said remaining portion of said original wall, and installing a compression sealing gasket between the cylinder block and cylinder head in contact with and extending entirely around said marginal portion of said insert wall.

2. The method of altering an original wall of an internal combustion engine comprised of cylinder head and cylinder block, said wall having an inner flame-contacted area defining a combustion chamber and an outer cooler-running area therearound, that includes: making an opening in said original wall by excising the entirety of said wall throughout the inner, flame-contacted combustion chamber area thereof and including a marginal portion of said wall outside said flame-contacted area along an outline encompassing and marginally spaced at all points outside the perimeter of said combustion chamber defining area of said wall, fabricating a replacement insert wall of outline substantially complementary to the opening so made in the original wall, and of loose fit therein, whereby to afford a thermal expansion joint between said insert wall and the remaining portion of the original wall, mechanically installing said insert wall in said opening, and installing a compression sealing gasket between the cylinder block and cylinder head in contact with and extending entirely around said marginal portion of said insert wall.

3. The method of altering the original combustion chamber defining cylinder head wall of an internal combustion engine comprised of a cylinder head and cylinder block, that includes: making an opening in said head wall by excising said head wall throughout an area encompassing and marginally exceeding the perimeter of the flame-contacted combustion chamber area thereof, providing a replacement insert wall to be received in the opening so made in the original wall, mechanically installing said replacement insert wall in the resulting opening in the original head wall, with said replacement wall essentially free of physical integration with the remaining portion of the original wall whereby to accommodate thermal expansion and contraction of the replacement wall relative to the remaining portion of the original wall, and installing a compression sealing gasket between the cylinder head and cylinder block in contact with and extending entirely around the perimeter of said insert wall.

4. The method of altering the original combustion chamber defining cylinder head wall of an internal combustion engine comprised of a cylinder head and cylinder block, that comprises: making an opening in said head wall by excising said head wall throughout an area encompassing and exceeding the perimeter of the flame-contacted combustion chamber area thereof, providing a replacement insert wall of a size and shape to be loosely received in the opening so made in the original wall, mechanically installing said replacement insert wall in the resulting opening in the original head wall with a loose fit affording freedom for thermal expansion therein, and installing a compression sealing gasket between the cylinder head and cylinder block in contact with and extending entirely around the perimeter of said insert wall.

5. The subject matter of claim 4, including also forming said replacement head wall with vertical support means engaging upwardly with remaining structure of said cylinder head when installed in said opening.

6. The method of repairing and reconstructing the head wall of the cylinder block of an internal combustion engine comprised of cylinder head and cylinder block, said head wall having an inner flame-contacted combustion chamber area defining a combustion chamber, a cylinder barrel opening upwardly therethrough, and an outer cooler-running area around said flame-contacted area, that comprises: making an opening in said head wall by excising the entirety thereof throughout the inner, flame-contacted combustion chamber area thereof and including a portion of said wall outside said flame-contacted area along an outline encompassing and spaced at all points outside the perimeter of said combustion chamber defining area of said wall, cutting away also at least an upper portion of said cylinder barrel, preparing a replacement unit, including insert wall and barrel member, with said replacement head wall having an outline substantially complementary to the opening made in the original head wall, mechanically installing said replacement head wall in said opening, preserving said replacement head wall essentially physically separate of the remaining portion of said original head wall, and installing a compression sealing gasket between the cylinder block and cylinder head in contact with the insert wall and extending entirely around and inside the junction between the perimeter of the insert wall and the periphery of the opening in the original wall.

7. The method of reconstructing the cylinder head of an internal combustion engine comprised of cylinder head and cylinder block, said cylinder head including an upper wall, a lower wall, and an interconnecting side wall, said walls defining a coolant chamber, said lower wall being comprised of an inner flame-contacted portion defining a combustion chamber and an outer cooler-running portion therearound, and said flame contacted portion having valve seats therein, said cylinder head including port tubes and valve guide supports which are integral with said flame contacted portion of said lower wall and with said upper and side walls of said head, that comprises: making an opening in said lower head wall by cutting away said wall throughout the inner, flame-contacted combustion chamber portion thereof and including a marginal portion of said wall outside said flame-contacted portion along an outline encompassing and marginally spaced at all points outside the perimeter of said combustion chamber defining portion of said wall, also removing from the cylinder head, with said cut-away lower wall portion, original port tube and valve support structure formed integrally therewith, fabricating a replacement unit for said removed parts, including an insert head wall with valve seats therein and of outline substantially complementary to the opening made in the original wall, and including replacement port tube and valve guide support structure, forming said replacement unit with vertical support means engageable upwardly with remaining structure of the cylinder head, installing said replacement unit in said cylinder head with its said support means vertically engaged therewith and with said insert wall inserted in said opening in the original lower head wall but essentially unintegrated therewith, whereby said insert wall is afforded freedom for thermal expansion and contraction relative to the remaining portion of said original lower head wall, fitting the port tube and valve guide support structure of the replacement unit to the remaining structure of the original cylinder head, and installing a compression sealing gasket between the cylinder block and cylinder head in contact with and extending entirely around said marginal portion of said insert wall.

8. The method of claim 7, including dimensioning the insert wall to have a loose fit in the opening made in the original wall.

References Cited in the file of this patent

UNITED STATES PATENTS

| | | |
|---|---|---|
| 1,309,033 | Irwin | July 8, 1919 |
| 1,592,009 | Mattice | July 13, 1926 |
| 1,703,111 | Kniatt | Feb. 26, 1929 |
| 2,170,015 | Ford | Aug. 22, 1939 |
| 2,291,162 | Kirby | July 28, 1942 |
| 2,446,291 | McAfee | Aug. 3, 1946 |
| 2,522,921 | Barkeij | Sept. 19, 1950 |
| 2,711,012 | Harman | June 21, 1955 |